Figure 1:
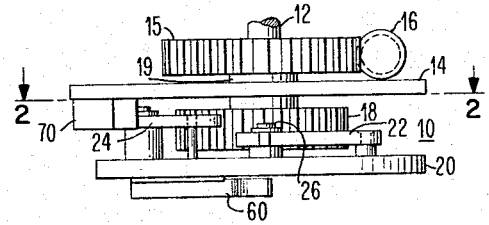

Sept. 27, 1966  T. A. LASKY  3,275,110
LATCH OPERATED CLUTCH WITH DUAL PAWLS
Filed Aug. 21, 1964

*INVENTOR*
THEODORE A. LASKY

BY *Francis V. Giolma*
ATTORNEY

United States Patent Office 3,275,110
Patented Sept. 27, 1966

3,275,110
LATCH OPERATED CLUTCH WITH DUAL PAWLS
Theodore A. Lasky, Vestal, N.Y., assignor to International Business Machines Corporation, New York, N.Y., a corporation of New York
Filed Aug. 21, 1964, Ser. No. 391,176
10 Claims. (Cl. 192—28)

This invention relates generally to clutches and has reference in particular to a positive detenting type clutch.

Generally stated, it is an object of the invention to provide an improved clutch for accurately positioning a driven member.

More specifically, it is an object of this invention to provide for using a secondary drive pawl in a clutch to provide a positive drive during disengaging of a primary drive pawl.

Another object of the invention is to provide a clutch having a driving member and a driven member, one of which carries primary and secondary drive pawls that are operatively connected and selectively engage the other member.

It is also an object of the invention to provide in a clutch for camming into driving relation a secondary drive pawl that is normally biased to a non-driving position, so that a primary drive pawl can be more readily disengaged.

Yet another object of the invention is to provide a clutch for cyclic operation of a stop member to engage a primary clutch pawl on a rotatable carrier to effect disengagement of the primary pawl from its driving relation with a driving member, and utilizing such actuation of the primary pawl to provide the actuating force for effecting release of a secondary pawl.

It is also an important object of the present invention to utilize a secondary clutch pawl in a drive for furnishing the driving force to effect positive release of a primary clutch pawl, and for rendering the secondary clutch pawl effective during a predetermined portion of the clutch travel to accurately determine the disengaging point of the drive.

Another important object of this invention is to provide for utilizing a secondary clutch pawl for furnishing a positive drive to a driven member during disengagement of a primary drive pawl and for preventing reversal of the driven member.

It is a further object of the invention to provide in a clutch for using a pulse responsive stop member for releasing a primary clutch pawl and using a fixed cam member for determining the engagement and release points of a secondary clutch pawl which provides the drive while the primary pawl is being released.

In practicing the invention in accordance with a preferred embodiment thereof, a positive detenting clutch drive comprises a rotatable shaft with pivotally mounted primary and secondary clutch pawls mounted on a carrier supported by the shaft for engaging with teeth of a driven member which is rotatably disposed on the shaft. The secondary clutch pawl is cammed by a stationary ramp into engagement with the teeth of the driving member during a predetermined angle of shaft rotation, and the primary pawl is selectively engaged by a movable stop to disengage from the teeth during this angle of rotation so that the secondary pawl provides the drive to effect disengagement of the primary pawl.

The foregoing and other objects, features and advantages of the invention will be apparent from the following more particular description of a preferred embodiment of the invention as illustrated in the accompanying drawings.

Figure 2:
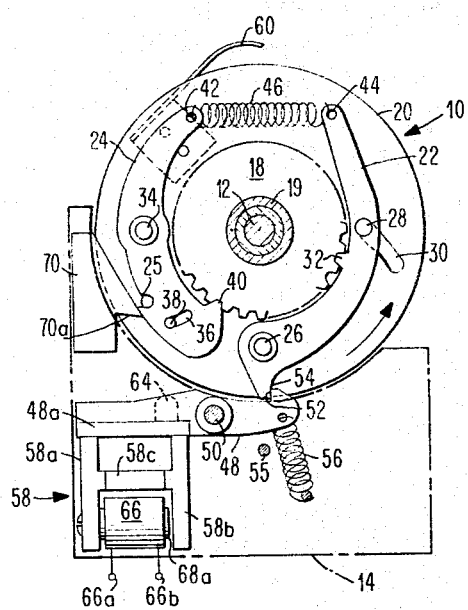
Figure 3:
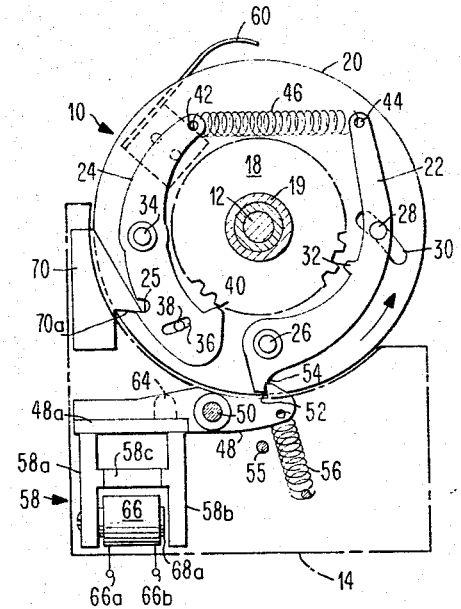

In the drawings:
FIGURE 1 is a partial front elevational view of a positive detenting clutch embodying the principle of the invention;
FIGURE 2 is a sectional plan view of the clutch taken along the line 2—2 of FIGURE 1 showing the clutch just prior to release; and
FIGURE 3 is a similar plan view showing the clutch after release.

Referring particularly to FIGURES 1 and 2, the reference numeral 10 denotes generally a positive detenting clutch in which a shaft 12, which is to be selectively driven, is rotatably supported and passes through suitable base plate 14. Rotatably mounted on the shaft 12 is a pinion 15 which is disposed to be continuously driven by means of a worm gear 16. The pinion 15 has secured thereto a gear-like driving member 18 which may be integral with the pinion 15, being connected thereto, for example, by the connecting boss or hub 19 which passes through base 14.

Secured to the shaft 12 is a carrier plate or disc 20 upon which are mounted primary and secondary clutch pawls 22 and 24, respectively. As best shown in FIGURE 2, the primary clutch pawl 22 is pivotally mounted on the carrier 20 by means of a pivot 26, and is provided with a guide pin 28 disposed to move in an elongated slot 30 for stabilizing operation of the pawl. The pawl is provided with a single tooth or detent 32 intermediate its ends disposed to engage with teeth on the driving member 18 for operatively connecting the driving member 18 and the carrier plate 20 to effect driving of shaft 12.

In order to provide for accurately positioning the shaft 12 when the primary pawl 22 is released, the secondary pawl 24 is pivotally mounted on the carrier plate 20 by means of a pivot 34 disposed intermediate its ends. The secondary pawl is provided with a transverse slot 36 for accommodating a guide pin 38 mounted on the carrier plate 20 adjacent the trailing end of the pawl relative to motion of the driving member 18. At this end also is provided a single tooth or detent 40 which is positioned an even number of teeth from the detent 32 of the primary pawl so that both detents may be readily engaged at the same time. The leading end of the secondary pawl and the trailing end of the primary pawl (relative to motion of the driving member 18) are provided with openings 42 and 44, respectively, for accommodating a spring 46 which normally biases the primary pawl 22 into engagement with the driving member 18, and normally biases the secondary pawl 24 out of engagement with the driving member.

Release of the primary pawl 22 from the driving member 18 may be effected by means of a selectively movable stop or latch member 48 which is pivotally mounted by means of a pivot 50 on the base plate 14 and provided with an abutment or shoulder 52 for engaging a corresponding abutment or shoulder 54 adjacent the pivot end of the primary pawl 22 to rotate it clockwise about the pivot 26 and release the detent 32 from the driving member 18. The stop or latch member 48 is normally biased to a non-operating position against a stop 55 by means of a spring 56 and is latched in the operating position by means of an electromagnetic latch means 58. A striker arm 60 carried by the carrier plate 20, being secured thereto by means of screws, is so mounted on the carrier plate that the projecting end portion projecting boss engages a portion 64 on the side of the stop member 48 opposite the abutment 52 for the purpose of returning the stop member 48 to the latch or operating position each time the carrier plate makes a rotation.

The latch means 58 comprises a substantially H-shaped core of magnetic material having a pair of outer legs 58a, 58b spaced apart and connected by means of a central connecting portion which includes a permanent magnet member 58c. The permanent magnet member normally provides sufficient flux to hold a magnetic armature portion 48a of the stop member 48 against the ends of the legs 58a and 58b so that the stop member 48 is retained in the operating position where it can engage the primary pawl. Release of the stop member 48 is effected by means of a release winding 66 which has an adjustable magnetic core portion 68a which may be threadably secured in the leg portion 58a to provide a variable air gap adjacent the leg portion 58b.

The permanent magnet 58c normally provides sufficient flux circulating through the upper portion of the leg members 58a and 58b and the armature 48a to hold the armature against the leg portions. By pulsing or otherwise suitably energizing the release winding 66 through selectively connecting the terminals 66a and 66b to a source of electrical energy to provide a polarity opposite that of the magnet 58c, sufficient flux may be produced across the air gap 68a to bleed the magnetic flux from the permanent magnet member 58c away from armature 48a and reduce the amount of magnetic flux passing through the armature 58a, so that the spring 56 is enabled to actuate the stop member 48 in a clockwise direction and release it from the operating position.

With the worm gear 16 being driven by means of a motor (not shown) so that it is continuously running and driving the driving member 18 through the pinion 15, and with the pawl members 22 and 24 in the positions shown in the FIGURE 3, both being released from the driving member 18, the driving member 18 rotates freely while the carrier plate 20 is held against rotation in the counterclockwise direction by the latch member 48, and against rotation in a clockwise direction by means of a ramp or cam member 70 which is secured to the base plate 14 for engaging the leading end of the secondary pawl 24 for camming the detent 40 into engagement with the teeth of the driving member 18. The detents 32 and 40 are so arranged that at the moment the abutment 52 of the latch member 48 engages the abutment 54 of the primary pawl 22 to commence withdrawing the detent 32 from engagement with the teeth of the driving member, the primary pawl will have no driving load since the secondary pawl 24 will previously have been cammed into operating relation with driving member 18 by the ramp 70 with the detent 40 engaging the teeth of the driving member, as shown in FIGURE 2. As shown in FIGURE 2, the camming surface of the ramp or camming member 70 is provided with a shoulder portion 70a which extends slightly beyond a latch detent or shoulder portion 25 of the secondary pawl 24 at the instant the abutment 52 of the stop 48 engages the abutment 54 of the primary pawl 22 to commence releasing the primary pawl. In the embodiment shown the shoulder 25 is approximately 3° from the end of the camming surface 70a at this point.

With the secondary pawl detent 40 providing the principal drive for the carrier plate 20, the carrier plate is rotated in a counterclockwise direction, and the abutment 54 of pawl 22 is forced against the abutment 52 of the latch or stop member 48, causing the primary pawl 22 to rotate in a clockwise direction about the pivot 26 to release the detent 32 from the driving member 18. By the time the detent 32 is released or clear of the driving member 18, as shown in FIGURE 3, the shoulder portion 25 of the secondary pawl 24 drops off the camming surface at shoulder 70a, and the spring 46 is effective in rotating the secondary pawl in a clockwise direction to release the detent 40 from driving engagement with the driving member 18. The carrier plate 20 will thus be locked against rotation in both directions.

Whenever the release winding 66 is pulsed the holding force of the permanent magnet 58c is overcome and the spring 56 is effective to withdraw the latch member abutment 52 from engagement with the primary pawl abutment 54. The spring 46 will be effective to rotate the primary pawl about the pivot 26 in a counterclockwise direction, causing the detent 32 to engage with the teeth of the driving member 18 and commence driving the carrier plate 20 in a counterclockwise direction. As the tail of the striker member 60 engages the projecting boss portion 64 of the latch member 48, it rotates the latch member 48 about its pivot 50 in a counterclockwise direction against the bias of the spring 56 and returns the latch member 48 to the latched position. Thus, by pulsing the release winding 66, at any time between reset by means of the striker 60, and the arrival of the primary pawl abutment 54 into operating relation with the abutment 52 of the latch member 48, the latch or stop member may be rendered inoperative and continuous operation of the carrier plate and the shaft 12 from the driving member may be effected. If the release winding is not pulse, the carrier plate will be driven for a single rotation and then stopped until the winding is again pulsed to release the primary pawl 22 for an engagement with the driving member 18 to effect another revolution of the carrier plate 20 and shaft 12 thus producing cyclic operation of the shaft 12.

While the invention has been particularly shown and described with reference to a preferred embodiment thereof, it will be understood by those skilled in the art that various changes in form and details may be made therein without departing from the spirit and scope of the invention.

What is claimed is:

1. A clutch comprising:
    a member to be driven,
    a driving member,
    a primary clutch member carried by one of said members for engaging the other member in driving relation,
    a secondary clutch member carried by said one member for engaging the said other member in driving relation,
    stationary means selectively operable to engage and actuate the primary clutch member to effect disengagement from said other member,
    stationary cam means actuating the secondary clutch member to move it into engagement with said other member before the primary clutch member is disengaged,
    and resilient biasing means for the primary and secondary clutch members.

2. In a clutch mechanism:
    a driving member,
    a member to be driven,
    primary clutch means carried by one of said members for engaging the other of said members in driving relation,
    secondary clutch means carried by said one member operable to engage said other member in driving relation,
    means selectively operable to engage and actuate the primary clutch means to effect disengagement thereof from said other member,
    stationary cam means disposed to actuate the secondary clutch means to effect engagement thereof with said other member in predetermined relation with the position in which disengagement of the primary clutch means occurs,
    and resilient means biasing the primary and secondary clutch means in opposite senses.

3. A drive comprising:
    a driving member,
    a member to be driven,
    primary clutch means carried by the member to be driven for engaging the driving member in driving relation,
    stationary means selectively operable to engage and actuate the primary clutch means for disengaging it from the driving member during movement of the member to be driven, secondary clutch means carried by the member to be driven for at times engaging the driving member in driving relation, stationary means for actuating the secondary clutch means to move it into driving engagement with the driving member prior to disengagement of the primary clutch means, and a spring directly connecting the primary and secondary clutch means to bias the secondary clutch means out of driving relation with the driving member.

4. In a drive:

a shaft to be driven, a driving gear having a plurality of peripheral teeth and rotatably disposed on said shaft, a carrier secured to said shaft adjacent said gear, selectively operable stop means, a primary clutch pawl having a detent for engaging the teeth of the driving gear and an abutment, said clutch pawl being pivotally supported on said carrier with the abutment engageable with said stop means in one of its positions to rotate the pawl about its pivot and disengage the detent from the gear teeth, a secondary clutch pawl pivotally supported on the carrier and having a detent positioned a whole number of teeth from the detent on the primary pawl, means biasing the pawls in opposite senses, and a stationary ramp member for engaging the secondary clutch pawl to cam it into engagement with the teeth of the gear just prior to engagement of the stop means and primary pawl abutment.

5. In a drive:

a rotatable shaft, a driving member rotatably mounted on said shaft and having a plurality of peripheral teeth, a carrier member secured to the shaft adjacent the driving member, a primary clutch pawl pivotally supported on the carrier member having a detent portion positionable between adjacent teeth of the driving member in one position and having a shoulder portion disposed to be engaged to rotate the pawl to another position for disengaging the detent portion from said teeth, a stop member selectively operable to engage said shoulder portion, a secondary clutch pawl pivotally supported by the carrier member and having a detent portion located an integral number of teeth from the detent portion of the primary clutch pawl, a stationary ramp positioned to cam the secondary clutch pawl detent between the teeth of the driving member just prior to engagement of said stop member and the primary clutch pawl shoulder portion, and a spring connecting adjacent ends of the clutch pawls remote from their pivotal supports.

6. In a drive:

a rotatable shaft, a driving member rotatably disposed on the shaft and having a plurality of peripheral gear teeth, a carrier plate secured to the shaft having one side adjacent the driving member, a primary clutch pawl pivotally supported at a pivot point on the plate to one side of the driving member having a detent disposed to be positioned between adjacent teeth to effect a driving relation between the driving member and the shaft and having a shoulder portion adjacent the pivot point, a stop member selectively operable to engage said shoulder portion to rotate the primary pawl about its pivot point to disengage the detent from between the teeth of the driving member, a secondary pawl pivotally supported intermediate its ends on the plate on the other side of the driving member with a clutch detent portion at the end adjacent the pivot of the primary pawl on the side adjacent the driving member and a latch detent portion on the side away from the driving member, a stationary ramp positioned to engage the secondary pawl and actuate the clutch detent portion thereof between the teeth of the driving member just prior to the point where the stop member is disposed to engage the primary pawl shoulder portion, said ramp being so positioned as to permit the secondary pawl to drop off the ramp and permit rotation of the secondary pawl to disengage the latch detent portion from the driving member teeth after the detent of the primary pawl is completely disengaged from said teeth, and a spring interconnecting the primary and secondary pawls to bias the secondary pawl latch detent portion out of engagement with the teeth of the driving member.

7. A drive comprising:

a rotatable shaft, a driving member rotatably mounted on the shaft, a carrier secured to the shaft, a primary clutch pawl pivotally supported by the carrier to one side of the driving member movable into and out of driving relation with the driving member, a secondary pawl pivotally supported by the carrier on the other side of the driving member movable into and out of driving engagement with the driving member, a spring operatively connecting the pawls to bias the primary pawl into and the secondary pawl out of engagement with the driving member, respectively, a stationary ramp disposed to engage the secondary pawl to actuate it into engagement with the driving member at a predetermined rotational position and for a predetermined angular distance, stop means positioned to engage the primary clutch pawl for actuating it out of driving relation with the driving member during the predetermined rotational distance the secondary pawl is actuated into driving relation with the driving member, means biasing the stop means out of engagement with the primary pawl, and releasable latch means for securing the stop means in a position to engage the primary clutch pawl.

8. In a drive:

a rotatable shaft, a driving member rotatably disposed on said shaft, a primary clutch pawl pivotally supported on the carrier operable into and out of driving engagement with the driving member, a secondary clutch pawl pivotally supported on the carrier operable into and out of engagement with the driving member, a spring interconnecting the primary and secondary pawls for respectively biasing them into and out of engagement with the driving means, a stationary ramp having a portion positioned to engage the secondary clutch pawl to operate it into driving engagement with the driving means for a predetermined rotational distance, a stop member having an armature portion of magnetic material operable into and out of engagement with the primary clutch pawl for operating said pawl out of driving engagement with the driving member, means biasing the stop member out of engagement with the primary clutch pawl, means on the carrier engaging the stop member to operate it into position to engage the primary clutch pawl, and releasable means for securing the stop member in said position including a permanent magnet disposed to furnish magnetic flux for attracting the armature portion of the stop member and electromagnetic shunt means providing a shunt circuit for diverting the magnetic flux from the permanent magnet to release the armature and the stop member.

9. A drive comprising:
a rotatable shaft,
a driven gear rotatably mounted on said shaft,
a carrier plate secured to the shaft adjacent said gear,
a primary clutch pawl pivotally supported on the carrier plate having a detent, said pawl being pivoted to permit movement into and out of engagement with said teeth,
a secondary clutch pawl pivotally supported on the carrier plate having a detent positioned an integral number of teeth from the primary clutch pawl detent, said secondary clutch pawl being pivoted to permit movement of its detent into and out of engagement with said teeth,
a spring connecting said pawls to bias the primary clutch detent into and the secondary clutch detent out of engagement with said teeth,
a stationary cam positioned to engage the secondary clutch pawl for actuating it to effect engagement of its detent with the teeth of the driving gear for a predetermined angle of rotation,
and stop means selectively operable to engage the primary clutch pawl to effect movement thereof to disengage its detent from the driving gear teeth during said angle of rotation.

10. In a clutch:
a rotatable shaft,
a driven gear member rotatably disposed on the shaft,
a carrier plate secured to and rotatable with said shaft,
a primary clutch pawl pivotally supported on said carrier plate having a detent, said pawl being pivotally movable to move said detent into and out of engagement with said teeth,
a secondary clutch pawl pivotally supported on said carrier plate having a detent, said secondary pawl being pivotally movable to move said detent into and out of engagement with said teeth,
a fixed ramp positioned for engaging the secondary clutch pawl to move its detent into engagement with said teeth during a predetermined rotational angle of movement of said carrier,
biasing means interconnecting said pawls to bias the primary pawl into and the secondary pawl out of engagement with said teeth,
and stop means selectively operable to engage and actuate the primary pawl to disengage its detent from the teeth during said predetermined rotational angle.

References Cited by the Examiner
UNITED STATES PATENTS

| | | | |
|---|---|---|---|
| 2,659,467 | 11/1953 | Zenner | 192—28 |
| 2,735,526 | 2/1956 | Gemmel | 192—28 |
| 3,016,252 | 1/1962 | Mitchell | 192—28 X |

DAVID J. WILLIAMOWSKY, *Primary Examiner.*

BENJAMIN W. WYCHE, III, *Examiner.*